May 9, 1939.　　　J. B. HADAWAY　　　2,157,333
BAIT HOLDER AND HOOK
Filed May 10, 1937　　2 Sheets-Sheet 1
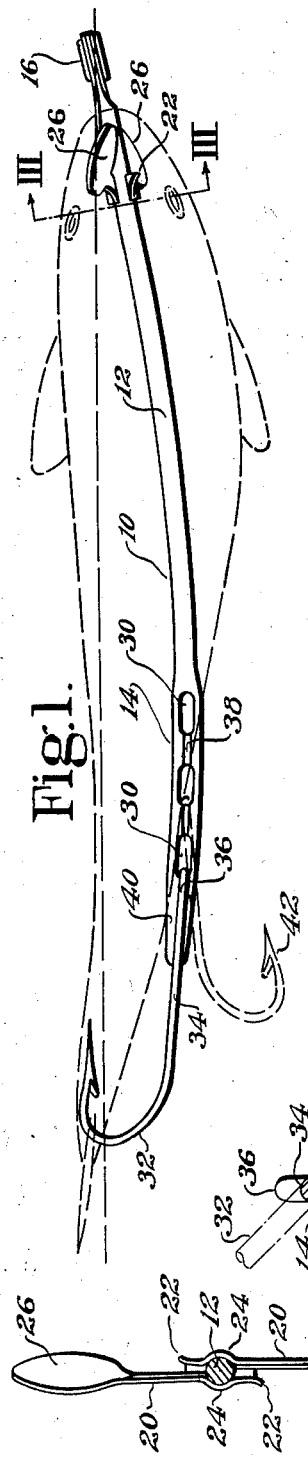
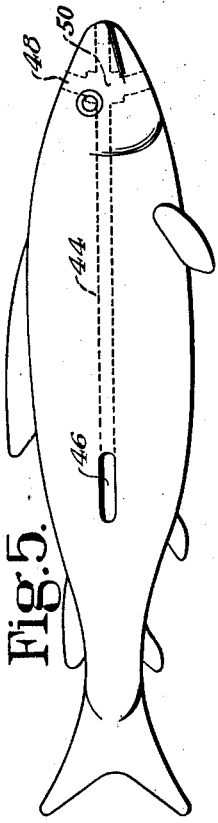
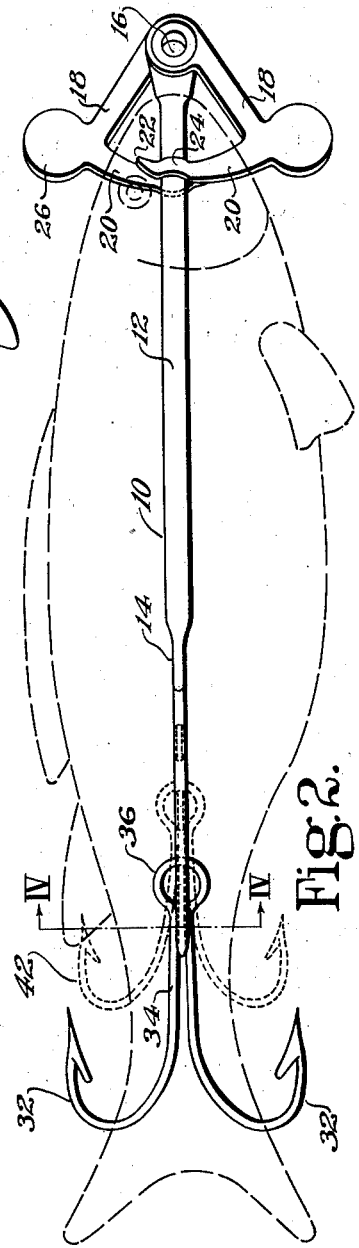
INVENTOR
John B. Hadaway
by his attorneys
Fish Hildreth Cary & Jenney May 9, 1939.  J. B. HADAWAY  2,157,333
BAIT HOLDER AND HOOK
Filed May 10, 1937   2 Sheets-Sheet 2
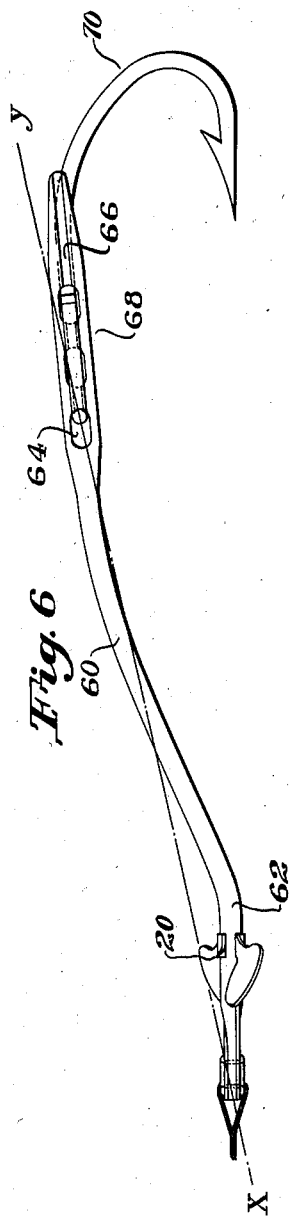
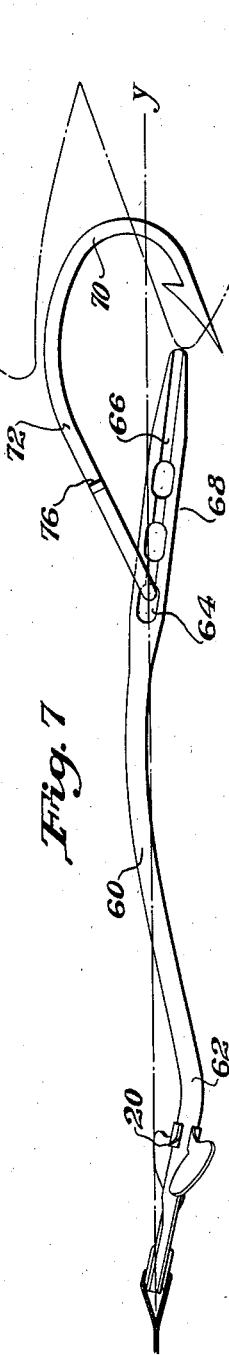
Inventor
John B. Hadaway
by his Attorneys
Fish, Hildreth, Cary & Jenney Patented May 9, 1939

2,157,333

UNITED STATES PATENT OFFICE 2,157,333

BAIT HOLDER AND HOOK

John B. Hadaway, Swampscott, Mass.

Application May 10, 1937, Serial No. 141,712

21 Claims. (Cl. 43—40)

The present invention relates to fishing tackle and more particularly to a bait holder and hook adapted to hold a minnow or other lure.

Heretofore, in such devices as commonly constructed an impaling needle has been provided upon which the minnow or other bait is impaled, securing devices being provided at one end of the needle for securing or retaining the bait on the needle, and a hook attached to the opposite end. These constructions were unsatisfactory, however, because the securing means, which were usually in the form of prongs pivotally mounted on the end of the impaling needle which were imbedded in the head of the minnow, were held in operative position only by the frictional engagement of the prongs with the head of the minnow, and thus were liable to become loosened, resulting in the loss of the bait or its displacement and deformation on the impaling needle.

Another objection to these prior devices was that the hook was loosely attached to the rear end of the impaling needle where it was free to swing about, with no certainty that it would be in the proper position to engage the fish when it seized the bait.

Still another objection to these earlier types was in the use of a straight impaling needle so that the minnow or other lure, particularly if it was artificial, would be held in straight position, or, if it was attempted to bend or curve the minnow as it was being impaled on the needle, the fisherman had to rely solely upon his own judgment and skill to secure the proper and most efficient curvature of the lure.

A further objection to these prior constructions was the liability of the fish to dislodge the hook, especially if it leaped from the water.

It is the object of the present invention to eliminate these objectionable features and disadvantages in these prior devices and to provide a construction of bait holder and hook in which the minnow or other lure will be securely held in the impaling member without liability of being lost or becoming loose and deformed, in which the hook is held fixedly at all times in proper position with respect to the bait, and in which the minnow will be given the desired predetermined and proper curvature with a minimum of skill and judgment on the part of the fisherman.

To the above ends the present invention contemplates the provision of locking devices for the impaling prongs or other means for securing the minnow or other bait to the impaling member so that these devices will be maintained or locked fixedly in operative position and loss of the minnow or other bait, or loosening on the impaling needle, will be prevented.

Another feature of the present invention is the supporting of the hook upon the rear end of the impaling member in fixed and predetermined position so that it will always be in the most effective position with respect to the bait to catch the fish when it strikes.

Still another feature is the forming of the impaling member or needle in a curved shape so that it will impart to the minnow or other lure when impaled thereon the proper curvature to give the minnow a natural and realistic appearance and produce, as the bait is drawn through the water, movements closely simulating those of a live, free minnow.

A further feature of the present invention is the provision of means, rendered operative by the strain or pull of the fish when it is hooked, to more or less completely close or lock over the barb of the hook, thereby preventing dislodgment thereof.

Other features will appear and be apparent to those skilled in the art from the following specification and accompanying drawings in which Fig. 1 is top plan view of the bait holder and hook forming the subject-matter of the present invention, showing these parts in full line, and in broken line an auxiliary hook and also a minnow positioned upon the holder; Fig. 2 is a side elevation of the same parts shown similarly in full and broken lines, but with a double hook shown in full line, and in broken line a second auxiliary double hook; Fig. 3 is a transverse section of the bait holder alone on III—III of Fig. 1 on an enlarged scale; Fig. 4 is a similar transverse section on IV—IV of Fig. 2, also on an enlarged scale, with the position of the hooks indicated in broken line; Fig. 5 is a side elevation, on a reduced scale, of an artificial minnow designed particularly for use with the bait holder and hook of the present invention; Fig. 6 is a top plan view of slightly modified forms of bait holder and hook in normal position; Fig. 7 is a similar view of the same with the parts in the positions they assume after a fish has been hooked; and Fig. 8 shows the hook detached.

The bait holder and hook illustrated in these drawings comprise, briefly, an impaling member or needle adapted to be inserted in the mouth of the minnow and forced down the gullet and into the rear body portion, emerging at one side. Securing means are provided in the form of impaling prongs pivoted at the front end of the impaling needle, which are adapted to be forced into each side of the head of the minnow with the pointed ends overlapping and engaging opposite sides of the needle with locking engagement. A hook connected by a loop is mounted in the rear end of the needle, with the loop passing through one of a series of transverse openings near the rear end, and the shanks on the hook engaging longitudinal grooves on the sides of the needle to normally position and hold the hook fixedly in position when in use. The impaling member and hook are so shaped and connected that when a fish is hooked, the parts move to positions such that the end of the impaling member covers or closes more or less completely the barb or point of the hook and effectively prevents dislodgment of the hook.

The specific form of impaling member or needle 10 shown in the drawings is of circular cross-section at its forward portion 12, while its rear portion 14 is swaged or flattened to increase the horizontal dimension and reduce the vertical dimension, as shown in Fig. 4. The member or needle is laterally curved from the front to the rear end, as shown in Fig. 1, the curvature being such that when inserted in the minnow the predetermined curvature or bending of the minnow will be secured.

The front end of the impaling needle is formed with a transverse opening 16 within which is fastened the snell or leader for attaching the bait holder and hook to the line.

Pivotally mounted in this transverse opening 12 are the securing devices for securing the bait on the impaling needle or member. These devices are in the form of arms 18 pivoted at one end to the impaling needle and carrying at the other at substantially right angles the curved fingers or prongs 20 having the pointed ends 22 to facilitate their penetration into the head of the minnow. When these impaling fingers are in operative position, as shown in Fig. 2, their free or pointed ends overlap, thereby completely enclosing or encircling a portion of the head of the minnow and holding the latter securely on the impaling member so long as the prongs remain in such operative position.

In order to lock these securing prongs in position so that accidental displacement and loss or loosening of the minnow or other bait is impossible, the impaling fingers or prongs have been bent adjacent their ends at 24 to form curved or arcuate offsets or detents which, when the prongs are in operative securing position, engage the impaling needle or member upon opposite sides and through the resiliency of the pivoted arms, hold these parts in securely locked position. To facilitate the yielding movement of the prongs when they engage the impaling member, the prong ends are bent slightly outwardly, as shown in Fig. 3.

It is often desirable to impart to the bait a spin or rotation about its horizontal axis as it is drawn through the water, and in order to produce this movement or to supplement or increase the same when produced by the curvature of the blade, spinning vanes or blades 26 have been provided at an angle or point of connection of the arms 18 and prongs 20 of the pivoted securing devices. These vanes 26 are so shaped that when these prongs are in operative position to secure the bait on the impaling member, the vanes will be disposed at a slight angle or inclination, as shown in Fig. 1, to cause rotation or spinning of the bait in the well known manner.

Inasmuch as the impaling member is forced rearwardly through the body of the minnow or lure, it is necessary that the hook attached to the rear end of the member shall be detachably secured thereto so that it may be mounted on the end of the needle after the latter has been forced through the side of the minnow and into the open. Accordingly, the rear or flattened portion 14 of the needle is provided with a series of openings 30 extending transversely through the needle from one flattened side to the other, and in one or another of these openings, depending upon the size or length of the minnow, is secured the hook. A satisfactory form of hook has been found to be that shown in Fig. 1 having a single barbed member 32 with a substantially straight shank terminating in the open ended eye or loop similar to that shown in Fig. 8, or if desired, a double hook may be used as shown in Fig. 2, comprising two barbed members 32 having substantially straight shanks 34 connected at their free ends by the eye or loop 36. This hook is attached to the impaling needle by passing one of the barbed members 32 through the appropriate opening 30, which is elongated, as shown, to provide sufficient clearance. The hook is then manipulated to bring the eye or loop 36 into the opening with the barbed members extending to the rear.

In order to position the hook fixedly on the impaling member the latter is provided with grooves 38 longitudinally disposed on the opposite flattened surfaces of the rear end portion 14 of the needle, these grooves being of a size and depth to receive the shanks 34 of the hook adjacent the eye and hold the hook in fixed position. The shanks 34 are so spaced apart, and the resiliency of the shanks and of the eye 36 are such that the hook will grip the impaling needle with sufficient force to maintain the hook in the desired predetermined position. In order to insure sufficient length of grip on the shanks when the hook is mounted in the rearmost opening, the impaling needle is provided with a rearward extension 40, and locking grooves are formed substantially the length of such extension.

If additional hooks are desired a second single hook may be used as indicated at 42 in dotted line in Fig. 1, or a second auxiliary double hook as indicated at 42 in Fig. 2. Preferably, when a second double hook is used, the barbed members 32 of the hook, instead of lying perpendicular to the plane of the flattened rear end of the impaling needle, are obliquely disposed to such plane and both extend on the same side thereof, as shown in Fig. 4. This facilitates the addition of the second double pronged hook 42, the members of which are in a similar manner obliquely disposed to the plane of the flattened rear portion of the impaling member and both are on the same side thereof, but oppositely to the prongs of the main or rear hook. Thus a hook may be provided having four barbed members set substantially ninety degrees from one another and held fixedly in position.

While the bait holder and hook of the present invention is designed primarily for use with real minnows, it may also be used with artificial minnows, and in Fig. 5 is shown a lure of this character. This may be made of rubber or other suitable material in the general shape and color of a minnow, and will be provided with suitable passages and cavities to receive the impaling needle and prongs. Thus, the artificial minnow will have a longitudinal passage, indicated at 44, for the impaling needle extending from its front end to an opening 40 in its side through which the impaling needle is projected. Where the artificial minnow is constructed of rubber or other flexible material, this passage 44 may be made straight and the minnow bent or curved as it is impaled on the needle.

Transverse openings 48 in the head of the minnow are provided for the impaling prongs 20, the openings 48 being enlarged at 50 where they intersect the longitudinal passage 44 to provide clearance for the out turned ends and curved locking recesses of the prongs.

In Figs. 6 to 8 are shown the manner in which the parts operate to prevent dislodgment of the hook when once imbedded in the mouth of a fish. The impaling member or needle 60 is the same as that shown in Figs. 1 and 2 except for the bend 62 immediately to the rear of the impaling prongs 20 when they are in locked position, and has the same series of openings 64 at the rear or impaling end, and the same longitudinal grooves 66 in the rearward extension 68. The hook 70 shown in these figures is of the single barb type illustrated in Fig. 8, having a shank portion 72 terminating in the eye or loop 74, with a return leg or extension 76, the shank and extension engaging the grooves on opposite sides of the impaling member to hold the hook normally in fixed position.

It will be noted that the barb or point of the hook is offset laterally from the broken line XY on Fig. 6, which passes through the opening in which the hook is pivoted and the point of attachment of the snell or fishing line at the forward end. As soon as a fish is hooked and strain is applied, this offset arrangement causes the shank portions of the hook to be forced out of the grooves and the hook to turn in the opening in the impaling member, bringing the parts into the position shown in Fig. 7, with the point of attachment of the snell, the point of connection of the hook to the member, and the point of strain of the fish all in the same straight line XY.

With the parts in these positions, the barb of the hook will be brought into proximity to the rear end of the extension 68 which will effectively prevent dislodgment of the hook however the fish may turn or twist or leap into the air.

The mode of use of the bait holder and hook of the present invention is as follows: The rear or impaling end of the holder being free and clear of the hook, and the impaling prongs at the head end being open, the impaling end of the needle is inserted in the minnow's mouth, down its gullet, and through its body, coming out on one side of its rear body portion. The impaling prongs are then swung inwardly, penetrating the head of the minnow from each side and being forced into locking engagement with the circular shank or body of the needle, thereby securing the minnow not only from longitudinal movement on the impaling needle, but also from rotation with respect thereto.

A hook of the desired size having been selected, one of the prongs is passed through the appropriate transverse opening, which is usually the one in the open nearest the body of the minnow. The hook is then manipulated to bring the loop or eye into the opening and the adjacent portions of the shanks of the barbed members into seating position in the grooves.

If a second hook is also to be used, it will be inserted in one of the openings nearer the impaling end of the needle and manipulated into the proper position. Due to the curvature of this portion of the needle and the clearance in the openings, both hooks will be seated in their adjacent grooves and held in fixed position.

Where the single hook as shown in Fig. 8 is used, the free end of the extension of the shank will be inserted in the appropriate opening and the hook manipulated to bring the eye into the opening with the opposing shank and extension engaging the oppositely formed grooves. By selecting one or another of the openings for the reception of the hook, the space or clearance between the end of the extension and the barb can be varied as the judgment of the angular dictates.

Where an artificial minnow is used, the manner of application of the bait holder is substantially the same, except that both impaling needle and prongs pass through the openings or passages already formed.

A snell or leader will be attached to the opening 16 in the front end of the impaling needle, the free end being connected with the usual swivel to the fishing line.

Due to the secure manner in which the bait or minnow is held upon the impaling needle and the method of mounting the hook, one may use the equipment for both casting and trolling without liability of the bait becoming lost or loosened and distorted on the needle, or the hook being displaced from proper position. The shape of the minnow, as determined by the impaling needle, causes a lifelike movement of the minnow as it is drawn through the water, which will be augmented if the spinning vanes are provided.

While in the foregoing description and accompanying drawings the preferred construction has been described and illustrated, it is to be understood that the present invention is not necessarily limited thereto, but may be embodied in other forms and arrangements within the scope of the language of the claims.

Having thus described the invention, what is claimed is:

1. A bait holder comprising an impaling member for supporting the bait, and an impaling prong pivoted on the member and held from bodily movement longitudinally thereof, the prong being adapted to be embedded in the bait to secure the same on the member, the prong being shaped to have locking engagement with the member when embedded in the bait.

2. A bait holder comprising an impaling member for supporting the bait, an impaling prong pivoted on the member in fixed position with relation thereto and adapted to be embedded in the bait to secure the same on the member, the prong being provided with a recessed portion adjacent its impaling end to engage the member and lock the prong in operative position.

3. A bait holder comprising an impaling member for supporting the bait, means pivoted on the member in fixed position with relation thereto and movable into and out of operative position to secure the bait on the member and prevent relative rotation of bait and member, a spinning vane to rotate the bait, and a locking device for locking said means and vane in operative position to secure and rotate the bait.

4. A bait holder comprising an impaling member for supporting the bait, an impaling prong pivoted on the member and in fixed position with respect thereto and adapted to be embedded in the bait to secure the same on the member, the prong being provided with a spinning vane to rotate the bait, and being shaped to have locking engagement with the member when embedded in the bait to hold the prong and its vane securely in operative position.

5. A bait holder comprising an impaling member for supporting the bait, a pair of impaling prongs pivoted on opposite sides of the member adjacent the end thereof and in fixed position with relation thereto and adapted to be embedded in the bait from opposite sides with their impaling ends overlapping, the prongs being provided with spinning vanes for rotating the bait and with open sided detents for engaging opposite sides of the member to lock the prongs in operative position to hold the bait and to rotate the same.

6. A bait holder comprising an impaling member for supporting the bait thereon, the member having a transverse opening spaced from one end to provide a substantial extension of the member between the opening and the end, and a hook having a shank with a loop at the end to be received in the opening to secure the hook to the member, the extension on the member having means to engage the shank of the hook to hold the hook in fixed position with relation to the member.

7. A bait holder comprising an impaling member for supporting the bait thereon, the member having a transverse opening at its end and a longitudinal groove adjacent thereto, and a hook having a shank adapted to be positioned in the groove with a return bend at its end to pass through the transverse opening to hold the hook fixed in position on the member.

8. A bait holder comprising an impaling member for supporting the bait thereon, the member having a transverse opening at its end longitudinal grooves on opposite sides of the member and adjacent the opening, and a hook having a shank with a return bend at its end and an extension thereon spaced from the shank, the return bend passing through the transverse opening and the shank and extension engaging the longitudinal grooves to hold the hook in fixed position on the member.

9. A bait holder comprising an impaling member for supporting the bait thereon, the member having a plurality of spaced transverse openings, and a hook having a shank with a return bend at its end secured in one of the openings, the member having provision for engaging the shank to hold the hook in fixed position in the member.

10. A bait holder comprising an impaling member for supporting the bait thereon, the member having a plurality of spaced transverse openings, and longitudinal grooves on opposite sides of the member adjacent the several openings, and a hook having a shank with a return bend at its end and an extension thereon spaced from the shank, the return bend passing through one of the openings and the shank and extension engaging opposite longitudinal grooves to hold the hook in fixed position on the member.

11. A bait holder comprising an impaling member for supporting the bait thereon, the member having a transverse opening at its end, and longitudinal grooves on opposite sides of the member and adjacent the opening, and a hook having a pair of prongs extending from shanks spaced from one another and connected at their end by a loop, the opening in the member being of a size to permit the passage of a prong and shank therethrough and to receive the loop with the shanks engaging the grooves to secure the hook in fixed position on the member.

12. A bait holder comprising an impaling member for supporting the bait thereon, the member having a transverse opening at its end and longitudinal grooves on opposite sides of the member and adjacent the opening, and a hook having a pair of prongs extending from shanks spaced from one another and connected at their ends by a loop, the prongs being obliquely disposed with respect to the plane of the shanks and loop and on the same side thereof, and the loop being positioned in the transverse opening and the shanks in the longitudinal grooves to secure the hook in fixed position on the member.

13. A bait holder comprising an impaling member for supporting the bait thereon, the member having a plurality of spaced transverse openings and longitudinal grooves on opposite sides of the member adjacent the openings, and a plurality of hooks each having a pair of prongs extending from shanks spaced from one another and connected at their ends by a loop, the prongs being obliquely disposed with respect to the plane of the shanks and the loop, and the hooks being secured to the member with the loops passing through the openings therein and the shanks engaging the grooves to hold the hooks in fixed position, the prongs on one hook being oppositely extended with respect to the prongs on another hook.

14. A bait holder comprising a curved impaling member for supporting the bait thereon with the rear end of the member free of the bait, and a hook secured wholly in said free rear end in fixed position with respect to the member and free of the bait.

15. A bait holder comprising an impaling member with the opposite sides of its rear portion flattened, and a transverse opening and longitudinal grooves in such portion to receive and hold a hook in fixed position.

16. A bait holder comprising a solid curved impaling member having an impaling end, the member supporting the bait in curved position, and a plurality of separate hooks detachably mounted independently of one another in fixed position free of the bait adjacent the impaling end of the member.

17. A bait holder comprising a curved impaling member for supporting the bait in curved position, and a hook having a shank and secured to the rear end of the member in fixed position, the shank of the hook forming with the member a continuous, substantially uniform curve.

18. A bait holder for holding an artificial minnow, having an impaling member for passage through a hole in the body portion of the minnow, and a pair of impaling prongs pivotally mounted in fixed position on the impaling member and adapted to be forced through openings in the head of the artificial minnow and into engagement with the impaling member to lock the prongs and the minnow on the impaling member.

19. A bait holder comprising a bait supporting member having provision for attachment at one end to a snell and having an opening spaced forwardly from the other end to provide a rearward extension of the member, a hook having a shank pivotally secured in the opening, and cooperating means on the member and the hook for normally holding the hook in fixed position with the point of the hook offset from a line joining the opening in the member to the point of attachment of the member to the snell and for yielding under strain to permit the shank of the hook to turn in the opening to bring the point of the hook in proximity to the end of the extension.

20. A bait holder comprising a bait supporting member having provision for attachment at one end to a snell and having an opening spaced forwardly from the other end to provide a rearward extension of the member, the member being bent to offset the opening laterally with respect to a line joining the end of the extension with the point of attachment of the snell, a hook having a shank pivotally mounted in the opening, and means for normally holding the hook in fixed position with its barb laterally offset with respect to said line and on the opposite side from the offset opening, and yielding under strain to permit the shank to turn in the opening to bring the end of the barb of the hook in proximity to the end of the extension.

21. A fishing hook comprising a supporting member having provision at one end for attachment to a snell and provided with an opening spaced forwardly from the other end to provide a rearward extension, the extension being angularly disposed with respect to a line joining the opening with the point of attachment of the snell the end of the extension being offset laterally to one side of said line, a barbed member having a shank pivoted in the opening, and means for normally holding the barbed member in fixed position and offset from said line in the same direction as the end of the extension and yielding, under strain, to permit the shank to turn in the opening to bring the barb of the hook into proximity to the end of the extension.

JOHN B. HADAWAY.